United States Patent
Berman et al.

(10) Patent No.: US 10,808,457 B2
(45) Date of Patent: *Oct. 20, 2020

(54) PLANETARY GEAR WITH BEAD STOP

(71) Applicant: Mechshade Systems, LLC, Middleton, WI (US)

(72) Inventors: Joel Berman, Hewlett, NY (US); Stephen Hebeisen, Amawalk, NY (US); Xi Ming Liarno, Bergenfield, NJ (US); Eugene Miroshnichenko, Oceanside, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/410,605

(22) Filed: May 13, 2019

(65) Prior Publication Data
US 2019/0264504 A1    Aug. 29, 2019

Related U.S. Application Data

(63) Continuation of application No. 15/483,668, filed on Apr. 10, 2017, now Pat. No. 10,337,243.

(51) Int. Cl.
*E06B 9/78*     (2006.01)
*F16H 19/06*    (2006.01)
(Continued)

(52) U.S. Cl.
CPC .............. *E06B 9/78* (2013.01); *E06B 9/326* (2013.01); *F16H 1/28* (2013.01); *F16H 19/0622* (2013.01);
(Continued)

(58) Field of Classification Search
CPC ......... E06B 2009/785; E06B 2009/425; E06B 2009/725; E06B 9/78; E06B 9/326; E06B 9/42; F16H 19/0622
See application file for complete search history.

(56) References Cited

U.S. PATENT DOCUMENTS 6,164,428 A    12/2000    Berman
6,474,393 B1   11/2002    Welfonder
(Continued)

FOREIGN PATENT DOCUMENTS

EP    0096664    12/1983
EP    0889193    1/1999
(Continued)

OTHER PUBLICATIONS

Examination Report dated Dec. 4, 2018 in UK Patent Application No. GB1805127.6.
(Continued)

*Primary Examiner* — Erin D Bishop
(74) *Attorney, Agent, or Firm* — Snell & Wilmer L.L.P.

(57) ABSTRACT

The geared window shade bracket comprises a sprocket having a ring gear on an inside circumference of the sprocket; a chain configured to be engaged with the sprocket such that, in response to pulling on the chain, the sprocket rotates; a sun gear that is configured to be restricted from rotation; one or more planet gears configured to rotate around the sun gear, wherein the one or more planet gears interface with the ring gear; and a planetary carrier configured to mate with the one or more planet gears. In response to the chain being pulled, the sprocket rotates, causing the planet gears to rotate, causing the planetary carrier to rotate, causing the hub to rotate, and causing a shade tube to rotate.

18 Claims, 3 Drawing Sheets

(51) Int. Cl.
*F16H 1/28* (2006.01)
*E06B 9/326* (2006.01)
*E06B 9/50* (2006.01)
*E06B 9/90* (2006.01)

(52) U.S. Cl.
CPC .......... *E06B 9/50* (2013.01); *E06B 2009/785* (2013.01); *E06B 2009/905* (2013.01)

(56) References Cited

U.S. PATENT DOCUMENTS

| | | |
|---|---|---|
| 6,505,668 B1 | 1/2003 | Fun |
| 6,685,592 B2 | 2/2004 | Fraczek |
| 8,136,569 B2 | 3/2012 | Bohlen |
| 2003/0178276 A1 | 9/2003 | Fraczek |
| 2009/0258752 A1 | 10/2009 | Hunter et al. |
| 2010/0219306 A1 | 9/2010 | Detmer |
| 2014/0262080 A1 | 9/2014 | Mann |

FOREIGN PATENT DOCUMENTS

| | | |
|---|---|---|
| EP | 1052365 | 11/2000 |
| EP | 1130211 | 1/2001 |
| EP | 1312748 | 5/2003 |
| EP | 1327744 | 7/2003 |
| EP | 1717399 | 11/2006 |
| FR | 2814492 | 3/2002 |

OTHER PUBLICATIONS

Search Report and Examination report dated Sep. 24, 2018 in UK Application No. 1805127.6.
USPTO; Non-Final Office Action dated Nov. 23, 2018 in U.S. Appl. No. 15/483,668.
USPTO; Notice of Allowance dated Mar. 6, 2019 in U.S. Appl. No. 15/483,668.
USPTO; Notice of Allowance dated Apr. 18, 2018 in U.S. Appl. No. 15/483,668.
UKIPO: Office Action dated Jan. 7, 2020 in GB Applicaiton No. 1909487.9.
Exam Report dated Sep. 11, 2019 in UK Application No. GB1909487.9.

PLANETARY GEAR WITH BEAD STOP

CROSS REFERENCE TO RELATED APPLICATIONS

This application is a continuation of, claims priority to and the benefit of, U.S. Ser. No. 15/483,668 filed Apr. 10, 2017 and entitled "GEARED BRACKET FOR A WINDOW SHADE," which is hereby incorporated herein in its entirety for all purposes.

FIELD

This disclosure generally relates to window shade systems, and more particularly, to a geared bracket that supports and controls a window shade.

BACKGROUND

A window shade system includes a window shade (e.g., roller shade) that is typically wound around a shade tube. The shade tube is typically mounted to a bracket on each end. The bracket usually includes mechanical components and a chain to enable the shade tube to be rotated. The rotation of the shade tube via the chain raises and lowers the roller shade. The brackets are mounted to a wall or other structure. The window shade system may include brackets mounted in a window pocket, overhead, ceiling mounting, jamb mounting, top-down mounting, sloped mounting, horizontal mounting or skylight mounting. The window shade system may also be controlled with a motor, wherein the motor receives instructions from a switch or software.

The typical bracket includes a looped chain that rotates through a sprocket within the bracket. The looped chain may hang down any length. The window shade industry often prefers that the bottom of the looped chain hangs down to near the bottom of the window shade (e.g., 4 inches from the window sill). If the system is configured such that the sprocket is the same diameter as the shade tube, the ratio of turns between the sprocket and the tube is typically 1:1. If each turn of the sprocket lowers the shade 1 foot, then a 10 foot diameter loop of a chain is often used with a 10 foot long window shade. Therefore, a chain length of about 20 feet is needed in order to lower a 10 foot window shade because only about half (i.e., about 10 feet) of the chain rotates through the sprocket. In other words, only the chain length from the sprocket and down to the bottom of the chain loop is used. As shown in FIG. 1, only the chain length from point A to point B (only about half the chain) is used to fully lower and fully raise the window shade.

Such window shade brackets may include a bead stop, wherein the bead stop is bigger than the other chain elements. The bead stop is also bigger than the opening in the bracket, such that the bead stop cannot enter the bracket and cannot rotate around the sprocket. Therefore, the bead stop prevents a user from pulling on the chain beyond the point where the chain fully raises or fully lowers the window shade. The bead stop may be set in place at a specific location along the chain such that the bead stops create upper and lower limits for pulling the chain and rotating the shade tube (and thus, raising or lowering the shade to the appropriate position). Bead stops have been used on window shade systems for decades, so consumers are very familiar with bead stops, and consumers have come to expect a bead stop to control their use of the bracket chain. As such, it is very important for window shade system manufacturers to include the bead stops on the bracket systems to give the consumer the same experience as in the past.

A bracket may also include gears which may reduce the force needed to rotate the chain. A geared bracket also includes a looped chain that rotates through a sprocket within the bracket, but the ratio of turns between the sprocket and the tube may be different than 1:1. For example, in a planetary gear system, when the ratio of turns between the sprocket and the tube is 3:1, the force needed to pull the chain in a geared bracket is ⅓ of a non-geared bracket. However, the chain must be pulled more times to fully open or close the shade. In this example, it takes 3 turns of the sprocket to lower the shade 1 foot, so it takes 30 turns of the sprocket to lower the 10 foot window shade. As such, with a chain length of 20 feet (10 feet on each side of the sprocket), pulling the chain from the sprocket to the bottom of the chain loop will cause the sprocket to rotate 10 turns, but only result in ⅓ of the shade movement. In other words, a point on the chain would need to rotate 1.5 laps to fully lower the 20 foot shade (also known as a continuous chain since the chain needs to keep rotating through the bracket). Therefore, a point on the chain would need to rotate through the sprocket during the 1.5 rotations. As such, a bead stop cannot be used because the bead stop is bigger than the opening in the bracket and cannot enter the bracket to rotate around the sprocket.

A geared bracket may also include a planetary gear type system (or epicyclic gearing). A planetary gear system may include a central gear (sun gear) and one or more outer gears (planet gears) revolving around the central gear. Existing brackets using a planetary system include the sun gear permanently mated to the sprocket, wherein a ring gear is used as the sprocket. As such, when the chain is pulled, the sprocket rotates causing the sun gear to rotate, which in turn rotates the shade tube in a 3:1 ratio (3 turns of the sprocket results in 1 turn of the shade tube). In other words, the input power is to the sun gear, and the output power is to the shade tube hub 280 (carrier).

However, such a planetary system is limited to a ratio that must be larger than 2:1. In particular, to obtain a lower ratio, the sun gear would need to have a larger diameter (and be the same size as the sprocket) to the point where no planet gears would be able to fit around the sun gear. As set forth above, because the ratio must be larger than 2:1, the chain must rotate through the sprocket more than one lap. As such, a planetary gear type system, a bead stop cannot be used on the chain because, as mentioned above, the bead stop is bigger than the opening in the bracket and cannot enter the bracket to rotate around the sprocket.

Importantly, without a bead stop, after the shade is fully lowered, the consumer could continue to unravel the shade off of the shade tube. Moreover, without a bead stop, after the shade is fully raised, the consumer could continue to rotate the shade such that the hembar (on the bottom of the shade) gets pulled into the roller system. If the hembar is pulled into the roller, the shade can flip over the shade tube, the shade or tube may disengage, the shade may get damaged, the hembar may get damaged or the hembar may not be able to be easily un-wound or easily exit from the roller system. Systems have been created to minimize these problems caused by not having a bead stop such as, for example, a device to restrict the number of rotations of the shade tube, or a hook that catches and stops the hembar before it enters the roller system. However, such systems include extra components and extra moving parts, which add weight, cost and failure points. As such, a need exists for a bracket that includes a geared system, but still operates with a chain having bead stops.

SUMMARY

In various embodiments, the geared window shade bracket comprises a sprocket having a ring gear on an inside circumference of the sprocket; a chain configured to be engaged with the sprocket such that, in response to pulling on the chain, the sprocket rotates; a sun gear that is configured to be restricted from rotation; one or more planet gears configured to rotate around the sun gear, wherein the one or more planet gears interface with the ring gear; and a planetary carrier configured to mate with the one or more planet gears. In response to the chain being pulled, the sprocket rotates, causing the planet gears to rotate, causing the planetary carrier to rotate, causing the hub to rotate, and causing a shade tube to rotate.

The chain may be threaded around an outside circumference of the sprocket. The chain may include one or more bead stops located on the chain, wherein the bead stop is restricted from entering the inside of a housing of the bracket. The sun gear may be configured to be restricted from rotation due to the sun gear including an opening (e.g., hexagonal) that mates with a shaft. The bracket may also comprise a wrap spring clutch and a hub that is configured to engage an end of a shade tube. The planetary carrier may be configured with a brake, wherein the brake is configured to impact a tang on a clutch to open a wrap spring on the clutch which allows the clutch to rotate. The ring gear may be configured with ring gear threads on at least a portion of an inside circumference of the ring gear. The one or more planet gears may include planet threads on an outside circumference of the one or more planet gears that interface with ring gear threads on at least a portion of an inside circumference of the ring gear.

BRIEF DESCRIPTION OF THE DRAWINGS

The subject matter of the present disclosure is particularly pointed out and distinctly claimed in the concluding portion of the specification. A more complete understanding of the present disclosure may be obtained by referring to the detailed description and claims when considered in connection with the drawing figures, wherein like numerals denote like elements. Each of the various Figures and components may be in accordance with various embodiments of the disclosure.

DETAILED DESCRIPTION

The features and elements discussed herein may be combined in various combinations without exclusivity, unless expressly indicated herein otherwise. These features and elements as well as the operation of the disclosed embodiments will become more apparent in light of the following description and the accompanying figures. The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
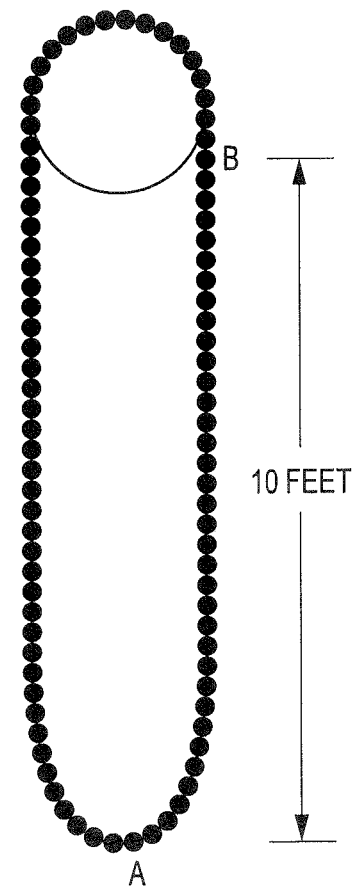
FIG. 1 shows a prior art chain and sprocket system, in accordance with various embodiments.
Figure 2:
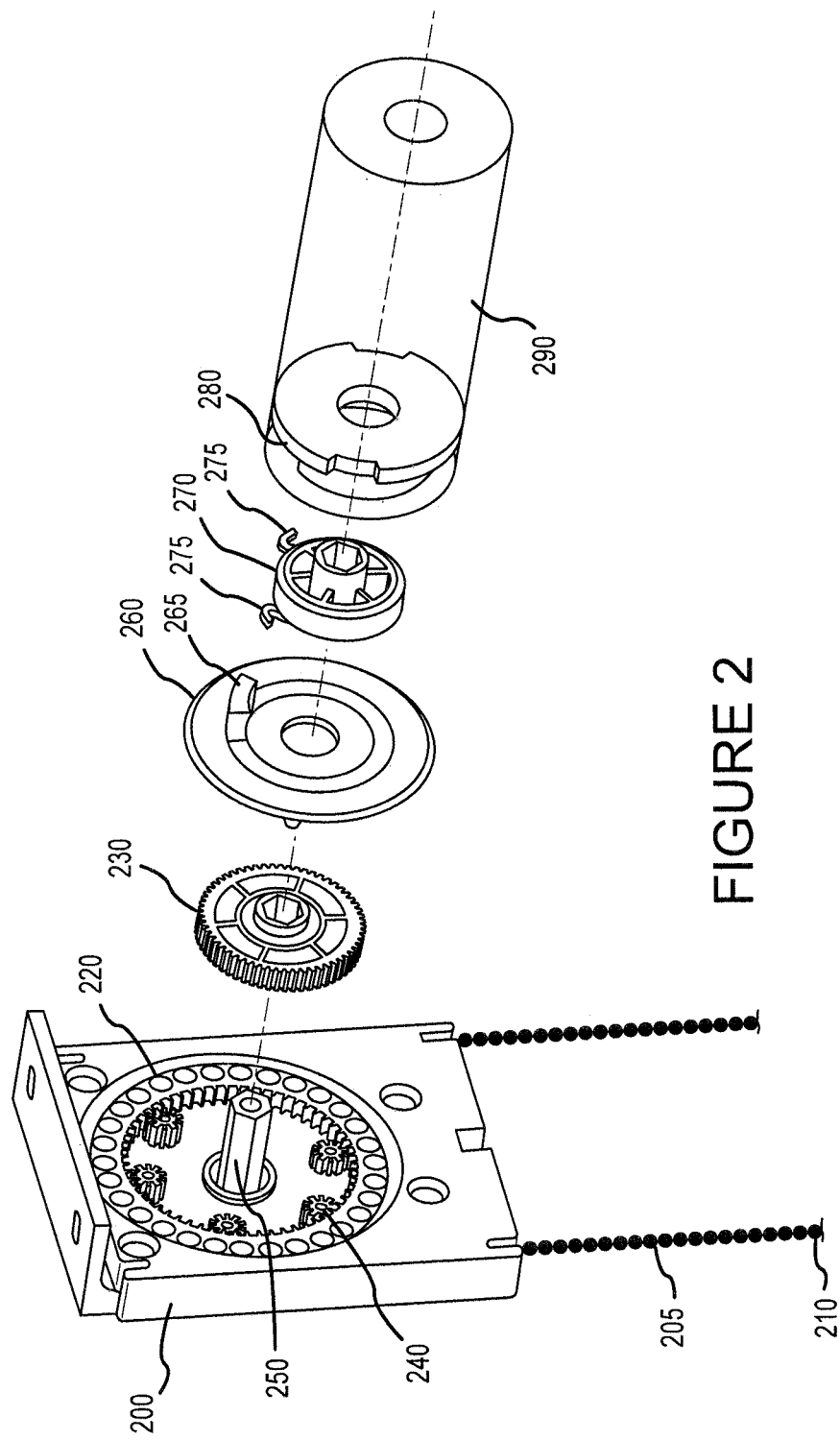
FIG. 2 shows an exemplary exploded view of the geared bracket, in accordance with various embodiments.

As set forth in FIG. 2, in various embodiments, the bracket 200 may include a chain 210, one or more bead stops 205, a sprocket 220, a sun gear 230, one or more planet gears 240, a shaft 250, a planetary carrier 260, a clutch 270 and a hub 280. The window shade system may include brackets 200 mounted in a window pocket, overhead, ceiling mounted, jamb mounted, a top-down mounting, sloped mounting, horizontal mounting and skylight mounting. As such, references to "down" and "up" would be changed accordingly.

The bracket 200 may include one or more openings that allow the chain 210 to enter and exit the bracket 200. The chain 210 may include one or more bead stops 205. The bead stop is bigger than the other chain elements. The bead stop is also bigger than the opening in the bracket 200 and cannot enter the bracket 200 to rotate around the sprocket 220. Therefore, the bead stop 205 prevents a user from pulling on the chain 210 beyond the point where the chain 210 fully raises or fully lowers the window shade 202. The bead stops 205 may be set in place at a specific location along the chain 210 such that the bead stops 205 create upper and lower limits for pulling the chain 210 and rotating the shade tube 290. Rotating the shade tube 290 raises or lowers the window shade 202 such that the hembar 203 (that supports the bottom of the shade 202) is moved to the appropriate position. As mentioned, bead stops 205 have been used on window shade systems for decades, so consumers are very familiar with bead stops 205, and consumers have come to expect a bead stop 205 to control their use of the bracket chain 210.

The chain 210 may at least partially wrap around the sprocket 220. The beads of the chain 210 may rest within the holes within the sprocket 220. As such, when the chain 210 is pulled, the beads of the chain 210 impact the holes and cause the sprocket 220 to rotate. In various embodiments, the sprocket 220 may also include a ring gear. The ring gear may be on the inside surface of the sprocket 220. The ring gear may include a threaded surface on at least a portion of the inner circumference of the ring gear.

The clutch 270 may be configured to be located between the planetary carrier 260 and the hub 280. The clutch 270 may include a wrapped spring. The wrapped spring may include tangs 275 on the ends of the wrapped spring. Upon rotation of the sprocket, and thus the planetary carrier 260, the brake 265 on the planetary carrier 260 may impact the tangs 275. In response to impacting the brake 265, the tang 275 causes the wrapped spring to expand which allows the clutch 270 to rotate and rotate the hub 280. More details about the wrap spring may be found in U.S. Pat. No. 6,164,428 issued on Dec. 26, 2000 entitled "Wrap Spring Shade Operator," which is hereby incorporated by reference in its entirety for all purposes.

A first side of the hub 280 may be configured to engage with the wrap spring. A second side of the hub 280 may be configured to engage with the shade tube 290. The second side of the hub 280 may include any configuration and any interface elements in order to mate with a similarly (or inversely) configured tube 290 end.

As also set forth in FIG. 2, in various embodiments, the bracket 200 may include a planetary gear system having a sun gear 230 and one or more planet gears 240 revolving around the sun gear 230. The sun gear 230 may be configured to be located around the shaft 250. The sun gear 230 may be configured to be located between the shaft 250 and the one or more planet gears 240. In various embodiments, the sun gear 230 may also include a protruding ring, wherein the planetary carrier 260 rotates around the protruding ring of the sun gear 230.

In various embodiments, the sun gear 230 may be configured to be stationary and the planet gears 240 may be configured to move about the sun gear 230. In various embodiments, the sun gear 230 may be restricted from movement using any device or component that impedes the rotation of the sun gear 230. For example, the sun gear 230 may include a hexagonal opening in the center of the sun gear 230. The sun gear 230 hexagonal opening may mate with the hexagonal shaft 250 such that the sun gear 230 is restricted from rotating. The sun gear 230 may include a threaded surface on at least a portion of the outer circumference of the sun gear 230.

In various embodiments, the bracket 200 also includes a planetary carrier 260. The one or more planet gears 240 may be mounted to the planetary carrier 260. The planet gear 240 may include a threaded surface on at least a portion of the outer circumference of the planet gear 240. The planet gears 240 may be between the sun gear 230 and the sprocket 220. The planet gear 240 threaded outer surface may interface with the threaded inside circumference surface of the ring gear on the inside circumference of sprocket 220. The planet gear 240 threaded outer surface may also interface with the outside circumference of the sun gear 230.

Mating the planet gears 240 to the planetary carrier 260 causes a planetary grouping that rotates together. As such, when the chain 210 is pulled, the sprocket 220 rotates causing the planet gears 240 to rotate around the stationary sun gear 230, which in turn rotates the planetary carrier 260. The planetary carrier 260 then rotates the hub 280 for the shade tube 290, which in turn, rotates the shade tube 290. In other words, the input power is to the ring gear/sprocket 220, and the output power is to the hub 280. In this arrangement, the system includes a ratio of less than 2:1 (less than 2 turns of the sprocket 220 results in 1 turn of the shade tube 290). In various embodiments, the ratio may be 1.6:1 or 1.7:1.

Figure 3:
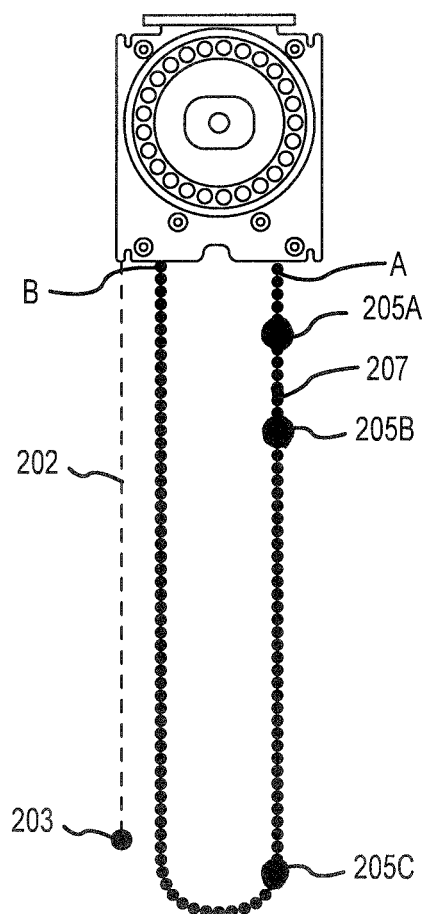
FIG. 3 shows a current chain and sprocket system, in accordance with various embodiments.

Because the ratio must be less than 2:1, more of the length of chain 210 goes through the sprocket 220. In particular, depending on the location of the bead stop, a point on the chain 210 immediately below the sprocket 220 (point A on FIG. 3) may rotate down and through the bottom loop of the chain 210, then back up to the other side of the sprocket 220 (point B on FIG. 3). As such, the consumer is able to pull on the chain 210 less times (than prior art geared brackets) to fully raise or to fully lower the window shade 202. If a non-geared bracket 200 uses about 20 feet of chain 210 to fully raise and fully lower a 10 foot shade 202, then the current bracket 200 uses only about 14 feet of chain 210. Moreover, in the current system, less force is required to pull on the chain 210. In particular, for a 1.7:1 ratio, 1.7 times less force is needed.

Because the ratio must be less than 2:1, the chain 210 rotates through the sprocket 220 less than one lap in order to fully lower shade 202 (also known as a discontinuous chain 210). As such, a bead stop 205A can be used on the chain 210. If the chain includes only one bead stop 205A, the bead stop 205A may also travel from a point on the chain 210 immediately below the sprocket 220 (point A on FIG. 3), then may rotate down and through the bottom loop of the chain 210, then back up to the other side of the sprocket 220 (point B on FIG. 3). If two bead stops are included on the chain, the two bead stops may be positioned close to each other on the chain to achieve the maximum ratio. For example, lower bead stop 205A and upper bead stop 205B on each side of the bead connector 207. However, the upper bead stop may be positioned further from the lower bead stop 205A (e.g., at alternative location 205C), if different ratios are desired. As mentioned above, bead stops 205 have been used on window shade systems for decades, so consumers are very familiar with bead stops 205. As such, window shade system manufacturers want to include the bead stops 205 on the systems to give the consumer the same experience as in the past.

The bracket 200 may interface with an environmental monitoring system and/or window shade adjustment system such as the SolarTrac® system manufactured by Mecho-Shade Systems, Inc. of Long Island City, N.Y. The SolarTrac® system is further described in U.S. Ser. No. 14/692,868, filed Apr. 22, 2015 and entitled "Automated Shade Control System Interaction with Building Management System," which is hereby incorporated by reference in its entirety for all purposes.

In various embodiments, the brackets 200 may support any size diameter of shade tube 290. For example, using a ring gear driven planetary system, bracket 200 allows the use of bead stops while using smaller tubes (e.g., tubes less than 1.8 inches with a window shade 202 of about 6 feet in length). Brackets 200 also allow for the ability to "recycle" the unused chain (because more of the entire length of the chain is going through the sprocket and not just half the chain as in non-geared systems), such that the bracket 200 may be applied to bigger tubes. Prior art planetary system brackets that drive via the sun gear and that have larger tubes may enable greater ratios while still having bead stops. For example, with a 2.5 inch tube, a ratio of up to about 3:1 is possible. However, in the prior art planetary gear system, a ratio of 5:1 is possible, but such a system would not allow the use of a bead stop because the chain would need to travel over 1 lap.

In contrast, in the current system, the ability to have a gear ratio below 2:1 allows the use of a bead stop. A gear ratio below 2:1 allows shorter window shades and/or window shades with a smaller shade tube (e.g., less than 1.79 inches) to use all or most of the chain. As a window shade gets taller and/or uses a larger shade tube, greater ratios become a possibility.

In various embodiments, the maximum gear ratio that can be used can be determined based off of calculating the unused length of chain in a chain loop. For shades with larger tubes (e.g., greater than 1.79 inches), more chain may exist, so a longer length of chain would be available for 1 lap of the chain loop through the sprocket 220 (i.e., more of the chain is recycled). In such an example, the ratio may be 2.5:1 or greater. Moreover, this example system may be driven by the sun gear. In other words, because of the larger ratio, the sun gear would not be stationary, and instead, the sun gear 230 would drive the hub 280 for the shade tube 290. In this manner, the system allows the choice of the best ratio utilizing the unused chain loop, while still enabling the use of bead stops 205, regardless of whether the hub 280 is driven via the ring gear or the sun gear 230.

In particular, in a roller blind, the upper most position corresponds to a position where the hembar is located at or near the bottom of the bracket. The lower most position corresponds to a position where the hembar is at or near the window sill. For a certain shade tube diameter with a certain number of wraps of the window shade on the shade tube 290 and a certain shade height, the travel distance of the window shade corresponds to a certain number of turns (T) of the shade tube 290.

Because the shade tube 290 and sprocket 220 in a non-geared system are in lock step, the number of turns of the shade tube 290 will include an equal number of turns of the sprocket 220. The linear amount of chain used would be the amount of chain per turn (determined by the pitch diameter (Pd) of the sprocket 220 multiplied by $\pi$) multiplied by the number of turns (T), namely $T*Pd*\pi$. The minimum amount of chain (Cm) used in a bracket system would correspond to the distance between the upper bead stop and lower bead stop (Dbs) plus the distance that is normally inside the bracket (Db) plus the distance used by the bead connector (Bc). This minimum length of chain is calculated by Dbs+Db+Bc. However, with this arrangement, the bottom of the chain loop will usually end up a significant distance (X) from the window sill. In order to bring the bottom of the chain loop closer to the bottom of the window sill for ease of use, extra chain is provided. This extra chain length (Cx) is never used.

In a typical shade system, the total amount of chain (Ct) is equal to Cm+Cx, wherein Cm is the total amount of chain required to bring the shade throughout its full range. For example, if a shade system requires 60" of chain travel but the total length of available chain is 90", the system can operate on a (90/60):1 or 1.5:1 ratio and still use bead stops.

The window shade system may or may not include fascia. The top flange may be any size. For example, the top flange may be a wide top flange for better access to the mounting hardware around the shade tube 290. The mounting flange may also include slots for easy adjustment in projection and width. The window shade system may support any motor or a manual adjustment mechanism. For example, a round-head motor (e.g., up to 25 Nm) or a star-head motor (e.g., up to 50 Nm). The system may also include a cotter pin placed in front of the motor compartment, to restrict the motor from sliding out of the motor compartment or vibrating itself outside of the motor compartment. The window shade system may include removable ears for pocket mounting.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Any reference to attached, fixed, connected or the like may include permanent, removable, temporary, partial, full and/or any other possible attachment option. Additionally, any reference to without contact (or similar phrases) may also include reduced contact or minimal contact. Different cross-hatching is used throughout the figures to denote different parts but not necessarily to denote the same or different materials. Surface shading lines may be used throughout the figures to denote different parts or areas but not necessarily to denote the same or different materials. In some cases, reference coordinates may be specific to each figure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The invention claimed is:

1. A geared window shade bracket comprising:
   a chain configured to be engaged with a sprocket such that, in response to pulling on the chain, the sprocket rotates;

a first bead stop located on the chain;
a sun gear that is configured to be restricted from rotation;
one or more planet gears configured to rotate around the sun gear; and
the one or more planet gears also configured to rotate a shade tube,
wherein less than 2 rotations of the sprocket results in 1 rotation of the shade tube.

2. The bracket of claim 1, wherein the chain is threaded around an outside circumference of the sprocket.

3. The bracket of claim 1, further comprising a second bead stop located on the chain.

4. The bracket of claim 1, wherein the bead stop is restricted from entering the inside of a housing of the bracket.

5. The bracket of claim 1, wherein the sun gear is configured to be restricted from rotation due to the sun gear including an opening that mates with a shaft.

6. The bracket of claim 1, wherein the sun gear is configured to be restricted from rotation due to the sun gear including a hexagonal opening that mates with a hexagonal shaft.

7. The bracket of claim 1, further comprising a clutch and a hub.

8. The bracket of claim 1, further comprising a wrap spring clutch.

9. The bracket of claim 1, further comprising a hub that is configured to engage an end of the shade tube.

10. The bracket of claim 1, wherein a ring gear on an inside circumference of the sprocket is configured with ring gear threads on at least a portion of an inside circumference of the ring gear.

11. The bracket of claim 10, wherein the one or more planet gears include planet threads on an outside circumference of the one or more planet gears that interface with the ring gear threads on at least a portion of the inside circumference of the ring gear.

12. The bracket of claim 1, wherein in response to the chain being pulled, the sprocket rotates, causing the planet gears to rotate and causing the shade tube to rotate.

13. The bracket of claim 1, further comprising the sprocket having a ring gear on an inside circumference of the sprocket, wherein the one or more planet gears interface with the ring gear.

14. The bracket of claim 1, further comprising a planetary carrier configured to mate with the one or more planet gears and the planetary carrier is also configured to rotate the shade tube.

15. The bracket of claim 14, wherein the planetary carrier is configured with a brake, wherein the brake is configured to impact a tang on a clutch to open a wrap spring on the clutch which allows the clutch to rotate.

16. The bracket of claim 14, wherein in response to the chain being pulled, the sprocket rotates, causing the planet gears to rotate, causing the planetary carrier to rotate, causing a hub to rotate, and causing the shade tube to rotate.

17. A method comprising determining a maximum gear ratio based on a length of chain in a chain loop and a diameter of a shade tube, wherein, in response to pulling the chain, a sprocket rotates, causing rotation of planet gears around a stationary sun gear, and causing rotation of the shade tube, wherein the maximum gear ratio allows inclusion of a bead stop on the chain loop, wherein the maximum gear ratio includes less than 2 rotations of the sprocket resulting in 1 rotation of the shade tube, and wherein the length of chain with the bead stop allows for fully lowering from the shade tube and fully raising a window shade around the shade tube.

18. A method comprising pulling a chain having a bead stop causing less than 2 rotations of a sprocket and resulting in 1 rotation of a shade tube, wherein, in response to the pulling the chain, the sprocket rotates, causing rotation of planet gears around a stationary sun gear, and causing rotation of the shade tube.

* * * * *

UNITED STATES PATENT AND TRADEMARK OFFICE
CERTIFICATE OF CORRECTION

PATENT NO. : 10,808,457 B2  
APPLICATION NO. : 16/410605  
DATED : October 20, 2020  
INVENTOR(S) : Joel Berman et al.

Page 1 of 1

It is certified that error appears in the above-identified patent and that said Letters Patent is hereby corrected as shown below:

On the Title Page

Item (71):  
Amend the Applicant's name from "Mechshade Systems, LLC" to --Mechoshade Systems, LLC--

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*